Patented Feb. 11, 1936

2,030,355

UNITED STATES PATENT OFFICE 2,030,355

AZODYESTUFFS AND THEIR PRODUCTION

Detlef Delfs, Leverkusen-I. G.-Werk, Germany, assignor to General Aniline Works, Inc., New York, N. Y., a corporation of Delaware No Drawing. Application July 28, 1934, Serial No. 737,477. In Germany August 18, 1933

8 Claims. (Cl. 260—56.5)

The present invention relates to a process for the manufacture of azodyestuffs and to the new dyestuffs obtainable in accordance with the said process; more particularly it relates to dyestuffs which may be represented by the probable general formula:

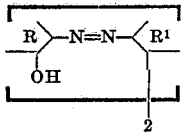

wherein R and $R^1$ stand for aryl radicals.

In accordance with the present invention azodyestuffs which are derived from 2,2'-diaminodiaryl compounds are prepared by reacting upon a mono- or poly-azodyestuff containing at least once the grouping:

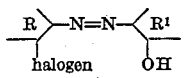

wherein R and $R^1$ mean aromatic radicals, in the presence of an acid-binding agent with copper, favorably in a finely divided form, or of a cuprous compound at elevated temperature. As acid-binding agents there are enumerated by way of example alkali- and alkaline earth-metal carbonates and bicarbonates, ammonia and organic bases. Suitable cuprous compounds for performing the process are for example, cuprous oxide, cuprous chloride, cuprous bromide and the like, and at least such a quantity of copper or a cuprous compound is used in the process as is sufficient for binding the halogen atoms in orthoposition to the azo-bridge of the parent dyestuff. As temperatures at which the process may be carried out may be mentioned such from about 70° C. to the boiling point of the reaction mixture; it shall be mentioned, however, that the process is not restricted to these temperatures and that it may be performed at higher temperatures, i. e. with the application of superatmospheric pressure. The process can be accelerated by adding a nitrogen containing base to the reaction mixture, such as ammonia, methylamine, dimethylamine, pyridine and the like. Further the reaction can be carried out with the addition of an organic solvent, such as alcohols, especially methyl or ethyl alcohol, which modification of carrying out the process is favorable in case water insoluble dyestuffs are used as starting compounds.

Depending upon the specific initial dyestuffs used, the new dyestuffs are soluble or insoluble in water and yield various shades.

The invention is illustrated by the following examples, without being limited thereto:

Example 1.—30 parts by weight of the sodium salt of the dyestuff from diazotized 2-chloroaniline-5-sulfonic acid and β-naphthol are dissolved in 500 parts by weight of water, 5 parts by weight of calcined soda are added thereto, and the solution is stirred at 90-95° C. with 10 parts by weight of copper powder. After 3 hours' stirring at 90-95° C., the reaction mass is diluted with 750 parts by weight of hot water and filtered. The filtrate is acidified with 50 parts by weight of glacial acetic acid, and the dyestuff is precipitated by adding 100 parts by weight of saturated common salt solution. The dyestuff having in the free state the following formula:

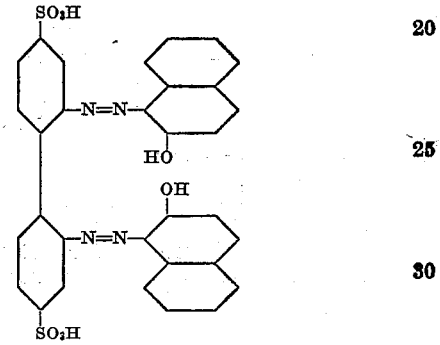

is filtered while hot, and for removing traces of copper salt is treated with hot hydrochloric acid of 2% strength. After drying it is obtained in form of a red powder, difficultly soluble in water with a scarlet coloration. From its aqueous solution it can easily be salted out and thereby distinguishes from the parent dyestuff. By splitting off the new disazodyestuff by reduction, there is obtained besides 1-amino-2-naphthol the 2,2'-diaminodiphenyl-4,4'-disulfonic acid.

Example 2.—30 parts by weight of the sodium salt of the dyestuff from diazotized 2-chloroaniline-5-sulfonic acid and β-naphthol are heated to 80-85° C. with 400 parts by weight of water and 100 parts by weight of aqueous methylamine solution of 25% strength. Then 2 parts by weight of cuprous chloride and 3 parts by weight of copper powder are added, and the mixture is stirred for about ½ hour at 80-85° C. In the reaction mass there is contained the same dyestuff as that obtained in accordance with Example 1.

Instead of the aqueous methylamine solution there can also be used an aqueous ammonia solution, and instead of the mixture of cuprous chloride and copper powder there can be used an equivalent quantity of cuprous chloride or of copper powder.

In an analogous manner the process can be performed with the dyestuff from diazotized 2-chloroaniline-4-sulfonic acid and β-naphthol.

*Example 3.*—120 parts by weight of the sodium salt of the dyestuff from diazotized 2-chloroaniline-5-sulfonic acid and β-naphthol are heated to 85° C. with an aqueous solution of 20 parts by weight of calcined soda in 500 parts by weight of water and 100 parts by weight of pyridine. At this temperature 15 parts by weight of copper powder are added, while stirring. The reaction is complete after few minutes. After working up the reaction mixture, there is obtained a dyestuff identical with that obtained in accordance with the processes of Examples 1 and 2.

The copper powder used can be substituted by an equivalent quantity of cuprous chloride.

In an analogous manner the process can be performed with a dyestuff from diazotized o-chloroaniline and the 2-naphthol-6-sulfonic acid or the 1-naphthol-4,7-disulfonic acid.

*Example 4.*—32 parts by weight of the sodium salt of the dyestuff from diazotized 1-chloro-2-aminonaphthalene-7-sulfonic acid and β-naphthol are heated for one hour at 85° C. with 500 parts by weight of water, 100 parts by weight of pyridine, 10 parts by weight of calcined soda and 10 parts by weight of copper powder. The copper containing reaction product which has separated is isolated, freed from copper and purified in the usual manner. In the dry state the dyestuff having in the free form the following formula:

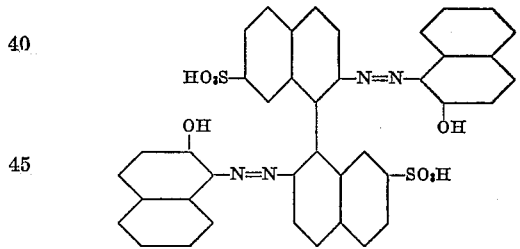

represents a dark red powder, soluble in water with a red coloration. On splitting off the dyestuff by reduction there is obtained besides 1-amino-2-hydroxynaphthalene the 2,2'-diamino-1,1'-dinaphthyl-7,7'-disulfonic acid.

*Example 5.*—22 parts by weight of the sodium salt of the dyestuff from diazotized 1-chloro-2-aminoanthraquinone and 2-naphthol-6-sulfonic acid are heated to 80° C. while stirring with 200 parts by weight of water and 50 parts by weight of pyridine. Then 4.5 parts by weight of potassium bicarbonate and 3 parts by weight of copper powder are added, and after this, the mixture is stirred for one hour at 80–85° C. The reaction product free from copper is obtained by removing the pyridine by steam distillation, removing the copper in the usual manner and salting out the dyestuff having in the free state the following formula:

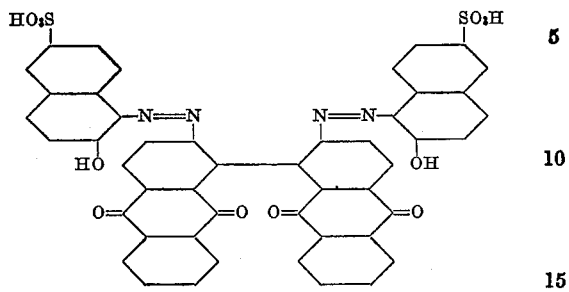

By treating with a reducing agent the dyestuff is transformed into flavanthrene.

The process proceeds in the same manner when using 2-chloro-3-aminoanthraquinone or 2-bromo-3-aminoanthraquinone.

*Example 6.*—19 parts by weight of the sodium salt of the dyestuff from diazotized 2-chloroaniline-5-sulfonic acid and p-cresol are heated for 2 hours, while stirring at 85–90° C., with 300 parts by weight of water, 60 parts by weight of pyridine, 5 parts by weight of calcined soda and 5 parts by weight of copper powder. The dyestuff having in the free state the following formula:

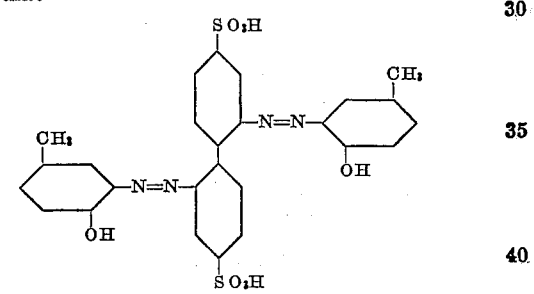

is isolated in the usual manner; in the dry state it represents a brown powder the acid aqueous solution of which having a yellow, and the alkaline solution having a brownish-red to red coloration. On splitting up the dyestuff by reduction, there is obtained besides aminocresol the 2,2'-diaminodiphenyl-4,4'-disulfonic acid.

*Example 7.*—35 parts by weight of the azodyestuff having the following formula:

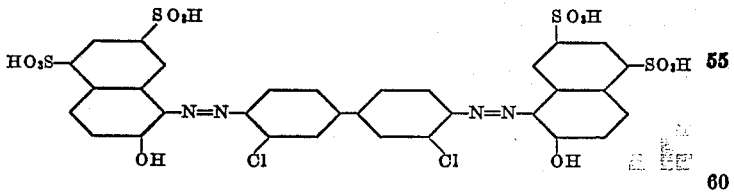

are dissolved in 1000 parts by weight of hot water with 5 parts by weight of calcined soda and 100 parts by weight of pyridine. The solution is heated, while stirring, to 90° C. and at this temperature 10 parts by weight of copper powder are added. Thus, a dyestuff is obtained which is soluble in water with a violet coloration.

*Example 8.*—30 parts by weight of the dyestuff from diazotized 2,5-dichloroaniline and β-naphthol are heated at about 80° C. in 500 parts by weight of ethylalcohol with the addition of 5 parts by weight of calcined soda and 10 parts by weight of copper powder. After 5 hours' heating the reaction mixture is diluted with water and the dyestuff of the following formula:

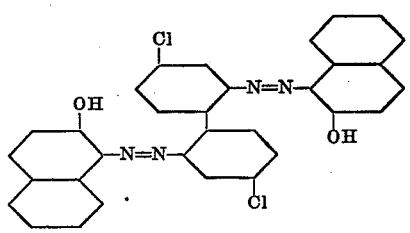

is isolated.

I claim:

1. The process which comprises reacting upon an azodyestuff containing at least once the grouping

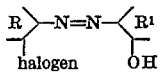

wherein R and R¹ mean aryl radicals, with a substance of the group consisting of copper and cuprous compounds in a quantity sufficient for binding the halogen at temperatures from about 70° C. to the boiling point of the reaction mixture and with the addition of a non-caustic alkaline acid-binding agent.

2. Process as claimed in claim 1, in which the process is carried out with the addition of a nitrogen containing base.

3. The process which comprises reacting upon an azodyestuff of the general formula:

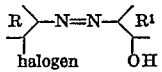

wherein R stands for the radical of a diazotization component and R¹ stands for the radical of an aromatic coupling component, with a substance of the group consisting of copper and cuprous compounds in a quantity sufficient for binding the halogen at temperatures from about 70° C. to the boiling point of the reaction mixture and with the addition of a non-caustic alkaline acid-binding agent.

4. Process as claimed in claim 3, in which the process is carried out with the addition of a nitrogen containing base.

5. The process which comprises reacting upon an azodyestuff of the general formula:

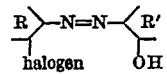

wherein R stands for the radical of a diazotization component of the anthraquinone series and R' stands for the radical of an aromatic coupling component, with a substance of the group consisting of copper and cuprous compounds in a quantity sufficient for binding the halogen at temperatures from about 70° C. to the boiling point of the reaction mixture and with the addition of a non-caustic alkaline acid-binding agent.

6. Process as claimed in claim 5, in which the process is carried out with the addition of a nitrogen containing base.

7. Azodyestuffs of the general formula:

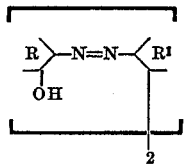

wherein R stands for the radical of a diazotization component and R¹ stands for the radical of an aromatic coupling component.

8. Azodyestuffs of the general formula:

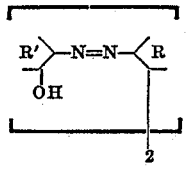

wherein R stands for the radical of a diazotization component of the anthraquinone series and R' stands for the radical of an aromatic coupling component.

DETLEF DELFS.